(12) United States Patent
Chen et al.

(10) Patent No.: US 6,388,419 B1
(45) Date of Patent: May 14, 2002

(54) MOTOR CONTROL SYSTEM

(75) Inventors: Li Chen, Livonia; Xingyi Xu, Canton; Richard Joseph Hampo, Livonia; Kerry Eden Grand, Chesterfield, all of MI (US)

(73) Assignee: Ford Global technologies, Inc., Dearborn, MI (US)

( * ) Notice: Subject to any disclaimer, the term of this patent is extended or adjusted under 35 U.S.C. 154(b) by 0 days.

(21) Appl. No.: 09/653,654

(22) Filed: Sep. 1, 2000

(51) Int. Cl.$^7$ .................................................. H02P 1/24

(52) U.S. Cl. .................. 318/727; 318/138; 318/254; 318/800; 318/801; 318/802; 318/803; 318/804; 318/805; 318/806; 318/807; 318/808

(58) Field of Search ................................. 318/139, 727, 318/800–811

(56) References Cited

U.S. PATENT DOCUMENTS

| | | | | |
|---|---|---|---|---|
| 5,285,862 A | * | 2/1994 | Furutani et al. | 180/65.4 |
| 5,345,155 A | * | 9/1994 | Masaki et al. | 318/138 |
| 5,532,571 A | * | 7/1996 | Masaki et al. | 318/809 |
| 5,661,380 A | * | 8/1997 | Ohara et al. | 318/139 |
| 5,739,664 A | * | 4/1998 | Deng et al. | 318/808 |
| 5,929,594 A | * | 7/1999 | Nonobe et al. | 320/14 |
| 5,959,431 A | * | 9/1999 | Xiang | 318/811 |
| 5,977,742 A | * | 11/1999 | Henmi | 318/801 |
| 5,994,881 A | * | 11/1999 | Miyazaki et al. | 322/16 |
| 6,046,553 A | * | 4/2000 | Matsunaga et al. | 318/139 |
| 6,147,470 A | * | 11/2000 | Ohashi et al. | 318/757 |

\* cited by examiner

Primary Examiner—Robert E. Nappi
Assistant Examiner—Tyrone Smith
(74) Attorney, Agent, or Firm—Ford Global Tech. Inc.

(57) ABSTRACT

A motor control system 16 for use within an electric vehicle 10 having an induction motor 12. Control system 16 utilizes a torque control module 18, a vector control module 20 and a space vector PWM module 22 to efficiently and accurately control the torque provided by motor 12.

18 Claims, 11 Drawing Sheets

| CURRENT SECTOR | CURRENT ANGLE | PWMA | PWMB | PWMC |
|---|---|---|---|---|
| 1 | $0 <= \Theta_i < \pi/3$ | +t_comp | -t_comp | -t_comp |
| 2 | $\pi/3 <= \Theta_i < 2\pi/3$ | +t_comp | +t_comp | -t_comp |
| 3 | $2\pi/3 <= \Theta_i < \pi$ | -t_comp | +t_comp | -t_comp |
| 4 | $\pi <= \Theta_i < 4\pi/3$ | -t_comp | +t_comp | +t_comp |
| 5 | $4\pi/3 <= \Theta_i < 5\pi/3$ | -t_comp | -t_comp | +t_comp |
| 6 | $5\pi/3 <= \Theta_i < 2\pi$ | +t_comp | -t_comp | +t_comp |

*Figure 20*

MOTOR CONTROL SYSTEM

FIELD OF THE INVENTION

This invention relates to a motor control system and more particularly, to a motor control system for use within a vehicle having an electric motor and which efficiently and accurately controls the torque provided by the motor, effective to satisfy the vehicle's torque demands.

BACKGROUND OF THE INVENTION

In order to reduce automotive emissions and the demand for fossil fuel, automotive vehicles have been designed which are powered by electric motors. Many of these vehicles use one or more sources of electrical power (e.g., fuel cells or batteries) to power an alternating current or "AC" induction motor, such as a three-phase motor.

These types of vehicles reduce emissions and the demand for conventional fossil fuels by eliminating the internal combustion engine (e.g., in completely electric vehicles) or operating the engine at only its most efficient/preferred operating points (e.g., in hybrid electric vehicles). However, these types of vehicles suffer from some drawbacks. For example and without limitation, the conventional motor control systems and strategies used within these vehicles often do not consistently ensure that the torque requested by a driver operating the vehicle is accurately provided by the vehicle's electric motor.

There is therefore a need for motor control system for use with an electric vehicle which substantially ensures that the torque requested by the driver of the vehicle is accurately provided by the vehicle's electric motor.

SUMMARY OF THE INVENTION

It is a first object of the invention to provide a motor control system which overcomes at least some of the previously delineated drawbacks of prior motor control systems, strategies and methodologies.

It is a second object of the invention to provide a motor control system for use within a vehicle which substantially ensures that the motor of the vehicle accurately provides the driver-demanded torque.

It is a third object of the invention to provide a motor control system for use within a vehicle having a DC type power source and an AC type induction motor.

According to a first aspect of the present invention, a motor control system is provided for use within a vehicle including an alternating current type electric motor, a direct current type electrical power supply, and at least one driver-operated control. The control system includes a torque control portion which receives torque commands from the at least one driver-operated control and which is effective to provide a torque current and a flux current based upon said received torque commands; a vector control portion which receives the torque current and said flux current and which is effective to provide a first voltage value and a second voltage value based upon the torque current and said flux current; and a space vector pulse-width modulating portion, which is coupled to the power supply and to said motor, which receives the first voltage value and said second voltage value and which delivers a multi-phase voltage signal to the motor, effective to cause said motor to accurately deliver the torque commands.

According to a second aspect of the present invention, a method is provided for controlling an alternating current induction motor within a vehicle including direct current power supply, and at least one driver-operated control. The method includes the steps of receiving torque commands from the at least one driver-operated control; generating a torque current and a flux current based upon the received torque commands; generating a direct axis voltage and a quadrature axis voltage based upon the generated torque current and flux current; converting the direct axis voltage and the quadrature axis voltage into three-phase voltage pulse width modulated signal; and using the pulse width modulated signal and the direct current power supply to provide a three-phase voltage signal to the induction motor, effective to cause the induction motor to accurately deliver the torque commands.

Further objects, features, and advantages of the invention will become apparent from the following detailed description of the preferred embodiment of the invention and by reference to the following drawings.

BRIEF DESCRIPTION OF THE DRAWINGS

FIG. 20 is a table illustrating time compensation in three phases versus the current sector.

DETAILED DESCRIPTION OF THE PREFERRED EMBODIMENT OF THE INVENTION

Figure 1:
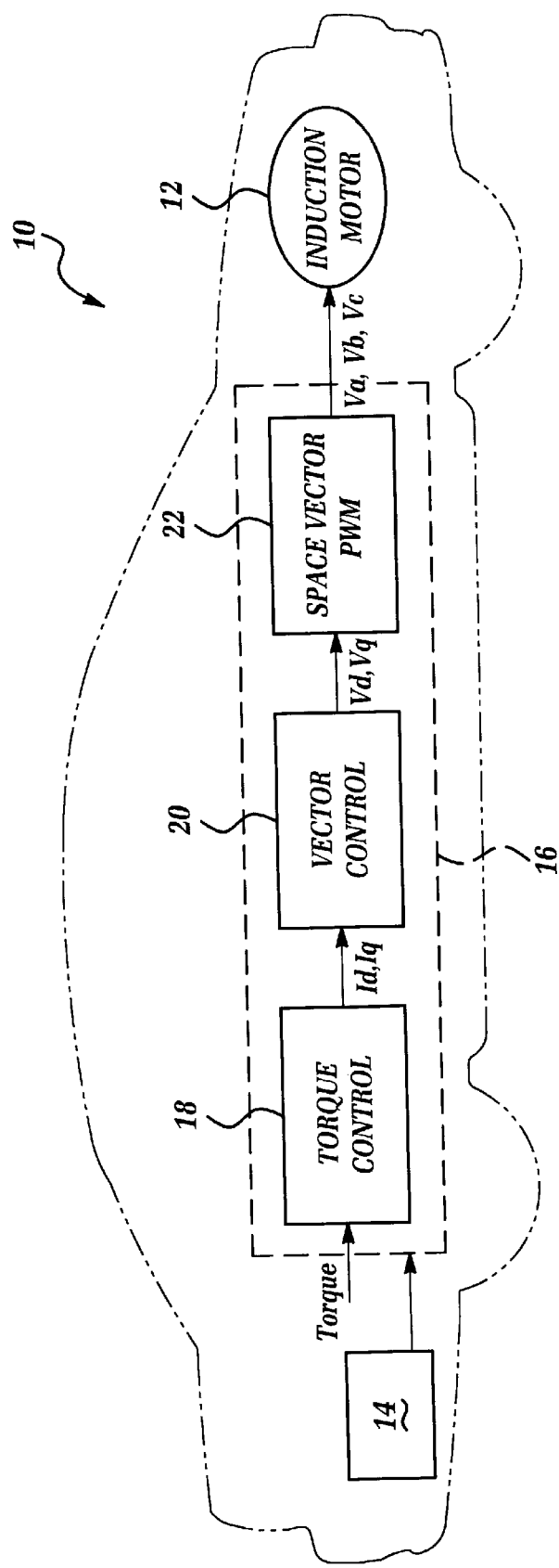
FIG. 1 is a block diagram of a vehicle which includes a motor control system which is made in accordance with the teachings of a preferred embodiment of the present invention.

Referring now to FIG. 1, there is shown an automotive vehicle 10 including a highly efficient motor control system 16 which is made in accordance with the teachings of the preferred embodiment of the present invention. Vehicle 10 includes an electric induction motor 12 which selectively provides power and torque to the vehicle's drivetrain and an electrical energy storage device 14 which selectively provides electrical power to the motor 12 by way of control system 16. As should be appreciated to those of ordinary skill in the art, vehicle 10 may comprise a either a conventional electric or hybrid electric vehicle.

In the preferred embodiment of the invention, electric motor 12 is a conventional electric induction motor which acts as a "power source" that provides torque and power to the vehicle drive train either exclusively (i.e., in an electric vehicle) or in addition to an internal combustion engine (i.e., in a hybrid electric vehicle). In the preferred embodiment, motor 12 operates by use of multi-phase (e.g., three-phase) AC electrical power.

Electrical energy storage device 14 is a conventional source of electrical power, such as a battery or a fuel cell. In the preferred embodiment, storage device 14 provides DC-type electrical power and is coupled to control system 16 which is effective convert the DC-type electrical power into AC-type electrical power for use with motor 12.

In the preferred embodiment, control system 16 includes one or more microprocessors or controllers as well as other chips, circuits and electrical components which cooperatively control the operation of induction motor 12. As described more fully and completely below, control system 16 receives signals and/or torque commands generated by vehicle operating systems and driver inputs (e.g., gear selection, accelerator position, and braking effort), and utilizes the received torque commands to control the operation of induction motor 12, effective to cause the motor 12 to accurately and consistently deliver the driver-demanded torque to the vehicle's drivetrain.

As shown in FIG. 1, control system 16 includes three primary functional blocks, modules or portions 18, 20 and 22, which cooperatively control the operation of motor 12 based upon the torque commands received from the vehicle controls. As described more fully and completely below, control system 16 includes a torque control portion or module 18, a vector control portion or module 20 and a space vector pulse-width-modulator "PWM" portion or module 22.

Torque Control

Figure 2:
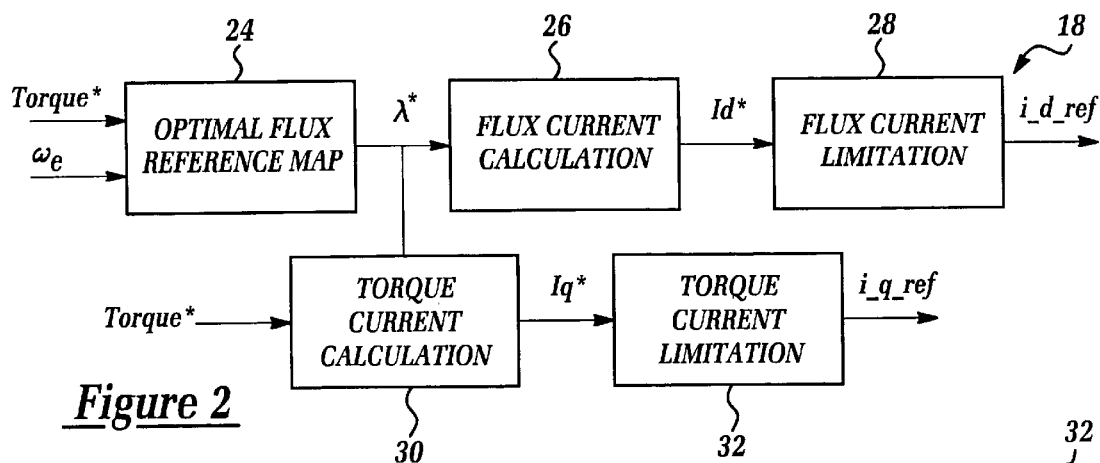
FIG. 2 is a block diagram illustrating functionality of the torque control module used within the control system shown in FIG. 1.

Referring now to FIG. 2, there is shown the preferred embodiment of torque control module 18. Module 18 is effective to generate a requested flux reference current, i_d_ref, and a requested torque reference current, i_q_ref, which are based upon the torque commands received from the vehicle controls.

Functional block 24 represents an optimal flux reference map which is generated based upon the attributes of the specific induction motor 12 and the DC bus voltage of the electrical energy storage device 14. The reference map may be stored within a database table or matrix within controller 16. In block 24, the reference map or table is used to select an optimal rotor flux level $\lambda^*$ by indexing the table using the inputted torque and the synchronous speed $\omega_e$ of the motor. This rotor flux level $\lambda^*$ is then used in functional block 26 to calculate the flux current $I_d^*$ by use of the following equation:

$$\lambda^* = I_d^* L_m \quad \text{(Eq. 1)}$$

where $L_m$ is the magnetizing inductance of motor 12. In functional block or step 28, a conventional ramp function is applied to the flux current $I_d^*$, since flux cannot be changed dramatically, thereby yielding a flux reference current i_d_ref. The flux reference current i_d_ref is also limited by a predetermined maximum flux current threshold value, p_id_max, and a predetermined minimum flux current threshold value, p_idmin_lim, and it is filtered. That is, if i_d_ref is less then p_idmin_lim, i_d_ref=p_id_max; and if i_d_ref is greater then p_id_max, i_d_ref=p_id_max. The value of i_d_ref is further limited by the value of the torque reference current i_q_ref (i.e., i_d_ref should not be bigger than i_q_ref).

In functional block or step 30, the torque current $I_q^*$ or $i_{qs}$ is calculated. As known, the torque from a field orientation control system can be given by the following equation:

$$\text{Torque} = 3^* \text{poles}^* L_m^* \lambda_{dr}^* i_{qs}/(4^* L_r) \quad \text{(Eq. 2)}$$

where "poles" are the number of poles of the induction motor; $L_m$ is the magnetizing inductance; $\lambda_{dr}$ is rotor flux reference; $i_{qs}$ is torque current; and $L_T$ is rotor inductance. Thus, when the rotor flux is set, the torque current $I_q^*$ or $i_{qs}$ is calculated as follows:

$$i_{qs} = 4^* \text{Torque}^* L_r/(3^* \text{poles}^* L_m^* \lambda_{dr}) \quad \text{(Eq. 3)}$$

Figure 3:
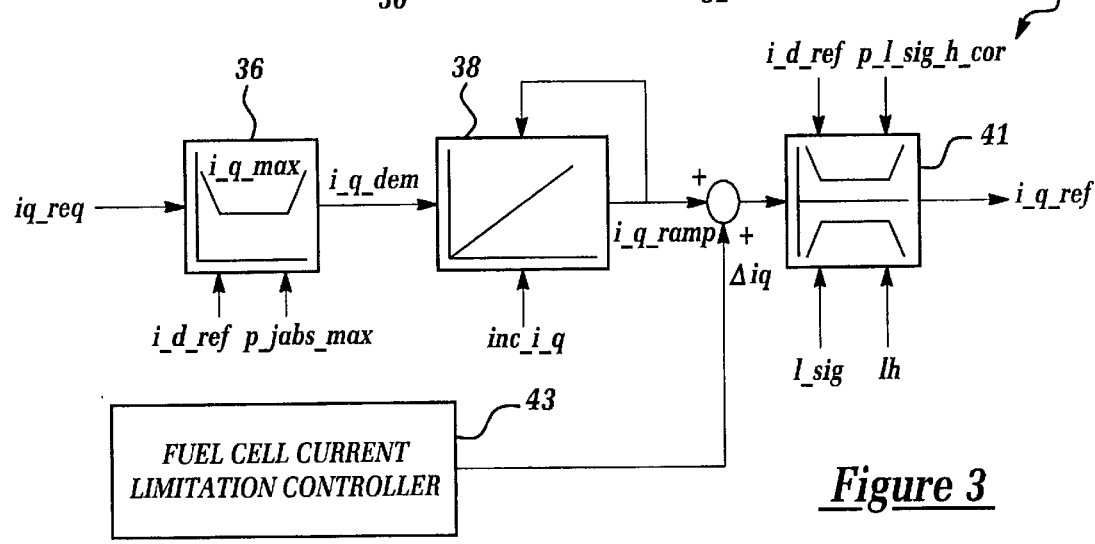
FIG. 3 is a block diagram illustrating one non-limiting embodiment of the torque current limitation function performed within the torque control module shown in FIG. 2.

In functional block or module 32, the calculated torque current is limited. FIG. 3 illustrates one non-limiting embodiment of the torque current limitation function performed by block 32. The inputs to block 32 are the requested or calculated torque reference current iq_ref; the flux reference current i_d_ref ($I_{ds}$); the error value $\Delta iq$; and the below-defined inductance values lh ($L_h$) and l_sig ($L_o$). The outputs of block 32 are the torque reference current, i_q_ref ($I_{qs}$). Block 32 also uses several motor specific parameters or values including p_l_sig_h_cor which has a default value of eighty percent (80%); p_iabs_max ($I_{s,\,max}$); and inc_i_q. In FIG. 3, blocks 36 and 41 represent conventional limiting functions or algorithms, block 38 represents a conventional ramping function; and block 43 corresponds to a conventional fuel cell or electrical power source current limitation controller. The following equations demonstrate the current limiting function provided by block 32.

Figure 4:
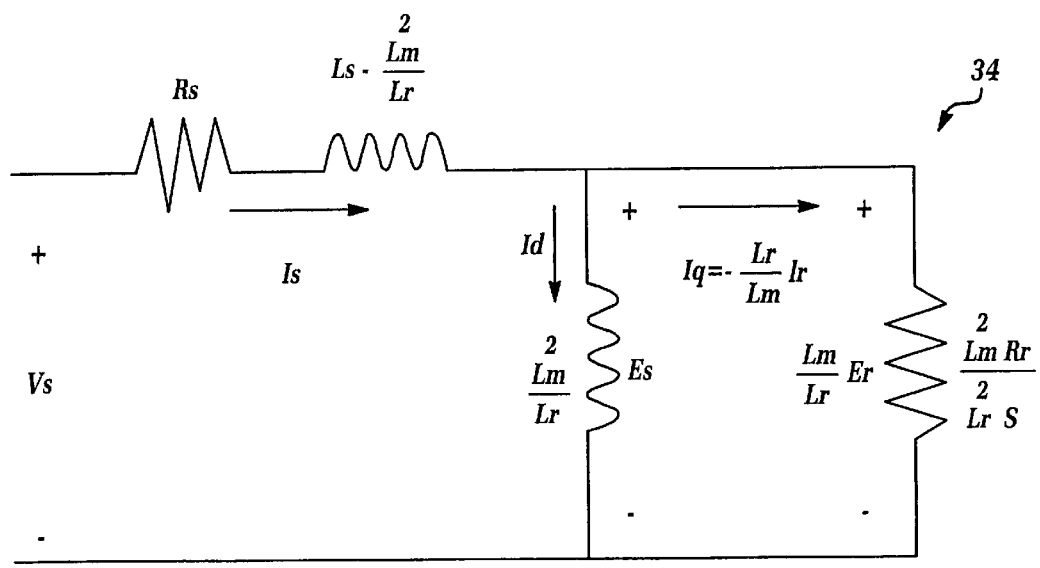
FIG. 4 is a diagram of a circuit used to model the motor in one non-limiting embodiment of the invention.

By modeling motor 12 using the d, q (direct, quadrature) axis equivalent circuit model 34 illustrated in FIG. 4, the d, q stator voltages may be represented by the following equations:

$$v_{ds} = r_s i_{ds} - \omega L_\sigma i_{qs} \quad \text{(Eq. 4)}$$

$$v_{qs} = r_s i_{qs} + \omega L_\sigma i_{ds} + \omega L_h i_{ds} \quad \text{(Eq. 5)}$$

where $v_{ds}$ is the stator voltage in the direct axis; $v_{qs}$ is the stator voltage in the quadrature axis; $r_s$ is the stator resistance; $i_{ds}$ is the stator current in the direct axis or the flux current; $i_{qs}$ is the stator current in quadrature axis or the torque current; ω is the fundamental excitation frequency; $L_\sigma$ is defined by the following equation $$L_\sigma = L_s\left(1 - \frac{L_m^2}{L_s L_r}\right) \text{ where} \tag{Eq. 5}$$

$$L_s = L_m + L_{ls}; \tag{Eq. 6}$$

$L_{ls}$ is the stator leakage inductance; and $L_h$ is defined by the following equation $$L_h = \frac{L_m^2}{L_r} \text{ where} \tag{Eq. 7}$$

$L_r = L_m + L_{lr}$ where $L_{lr}$ is the leakage inductance for the rotor.

Referring back to Equations 4 and 5, by neglecting the stator voltage drop cross resistance for high speed operation, $$v_{ds} \approx -\omega L_\sigma i_{qs} \tag{Eq. 8}$$

$$v_{qs} \approx \omega L_\sigma i_{ds} + \omega L_h i_{ds} \tag{Eq. 9}$$

For the given value of flux current and torque current, the voltage drops must meet condition of $$v_{ds}^2 + v_{qs}^2 \leq V_{s,max}^2 \tag{Eq. 10}$$

and $$I_{s,max}^2 \geq I_{ds}^2 + I_{qs}^2 \tag{Eq. 11}$$

since $$V_{ds} \leq V_{qs} \tag{Eq. 12}$$

From equation (Eq. 8) and (Eq. 9)

$$I_{qs} \leq \frac{L_\sigma + L_h}{L_\sigma} I_{ds} \tag{Eq. 13}$$

By adding the calibrated parameter p_1_sig_h_cor, $$I_{qs} \leq \frac{L_\sigma + L_h}{L_\sigma} I_{ds} * p\_1\_sig\_h\_cor \tag{Eq. 14}$$

If the torque current is limited by the maximum value, a flag(csw_iq_lim_act) is set, otherwise the flag is cleared. From Equation (Eq. 11)

$$I_{qs,max}^2 \leq I_{s,max}^2 - I_{ds}^2 \tag{Eq. 15}$$

$$I_{qs,max}^2 \leq I_{s,max}^2\left(1 - \frac{I_{ds}^2}{I_{s,max}^2}\right) \tag{Eq. 16}$$

-continued $$I_{qs,max} \leq I_{s,max}\sqrt{1 - \frac{I_{ds}^2}{I_{s,max}^2}} = \tag{Eq. 17}$$

$$I_{s,max} * sqrt1\_tab\left(\frac{i_{ds}}{i_{s,max}}\right);$$

here $$sqrt1\_tab\left(\frac{i_{ds}}{i_{s,max}}\right) = \sqrt{1 - \frac{I_{ds}^2}{I_{s,max}^2}} \tag{Eq. 18}$$

The torque request current i_q_req from vehicle control is limited by equation (Eq. 17) and the torque reference current i_q_ref is limited by equation (Eq. 14).

Vector Control

Referring back to FIG. 1, the calculated or determined flux reference current i_d_ref ($I_d$) and torque reference current i_q_ref ($I_q$) are communicated to the vector control module 20. Vector control is very sensitive to induction motor specific parameters. Hence, the D-Q reference voltage, current and slip frequency are all calculated using motor specific parameters. The correct motor parameters are essential for efficient control. Since different motors are installed in different vehicles, all parameters related to a specific motor have to be calibrated for the vehicle in which the motor is used.

As should be known to one of ordinary skill in the art, motor parameters vary with currents, temperature and frequency. Magnetizing inductance, which will be saturated when flux current is high, is the most important parameter in vector control. As the accuracy of flux frequency is very important within vector control systems, a digital deadbeat adaptive controller is implemented within block 20. Using this approach, an approximate inverse model error function based on the rotor flux error is used so that the deviation in slip gain can be predicted directly. Module 20 further includes a flux observer (closed-loop current and voltage model via a speed-dependent gain) which is applied to estimate rotor flux. A current model is used during low speed operation, and a voltage model is used while motor is running at high speeds. The nonlinear gain function, which precisely controls the closed-loop observer bandwidth, permits a transition from the current to voltage model flux estimating attributes based on rotor speed. The gain function also allow for the implementation of an online parameter tuning in which the voltage model tunes the current model at higher speeds.

The demanded D-Q voltages are the combination of dynamic and stable voltages. The dynamic voltages are calculated from the feedback currents of the motor. Two phase current controllers are also implemented within block 20 and provide a quick response to dynamic changes of vehicle condition. The stable voltage will dominant the control voltage when the vehicle is in stable condition and dynamic voltage decreases to around zero. The feedback currents are close to setting currents. The feedback D-Q current is transformed from the measured phase currents. The vector rotator function includes transformation of three phases to a-b axes, and a-b axes to D-Q axis. The foregoing functionality of module 20 is more fully and completely described below.

Figure 5:
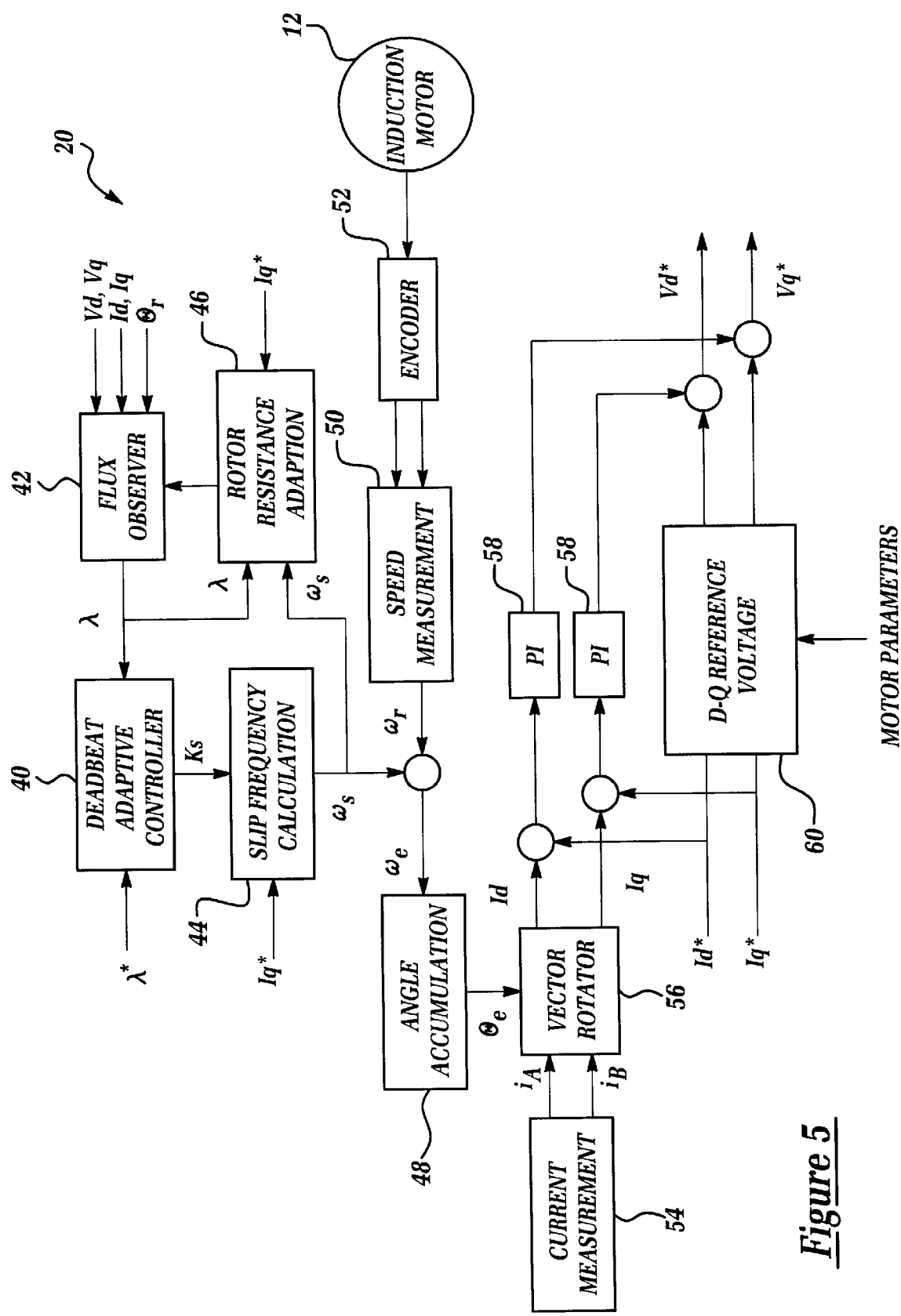
FIG. 5 is a block diagram illustrating the functionality of the vector control module used within the control system shown in FIG. 1.
Figure 6:
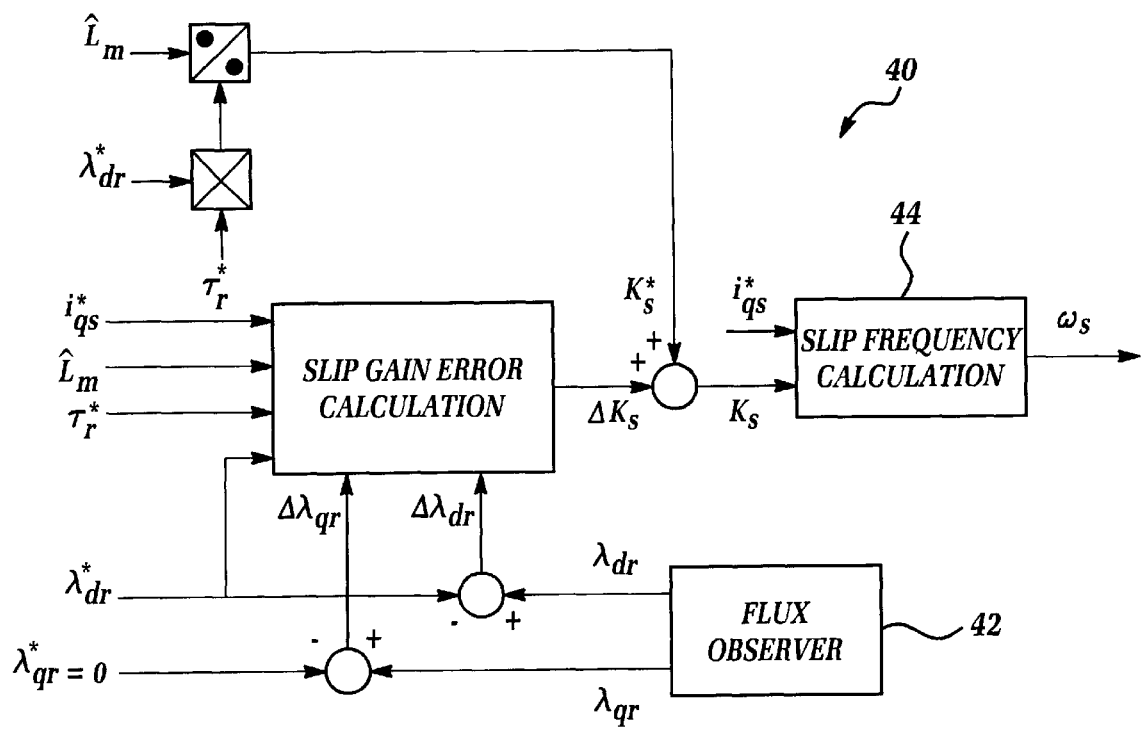
FIG. 6 is a block diagram illustrating the interrelationship between an adaptive control module, a flux observer module and a slip frequency calculation module used within the vector control module shown in FIG. 5.

To better understand the function of vector control module 20, reference is now made to FIG. 5 which illustrates one non-limiting embodiment of the vector control module 20. Vector control module 20 comprises several functional blocks, portions or modules 40–60. Block 40 represents a deadbeat adaptive control module or portion. Referring now to FIG. 6, there is shown block 40 as it interrelates with blocks 42 and 44 in one non-limiting embodiment. The basic principle of the adaptive deadbeat controller 40 is to measure the rotor flux error for use as a feedback signal and to compute the slip frequency correction needed. The relationship between the rotor flux error and the slip gain error when detuning occurs (variation of parameters) is the key point in the implementation of the deadbeat adaptive controller. The two rotor flux components are effected by any amount of detuning due the change in the machine parameters. The function of block 40 is best described by the following equations.

The Q-axis rotor voltage of the induction motor can be written as, $$0 = r_r i_{qr} + p\lambda_{qr} + \omega_s \lambda_{dr} \qquad (Eq.\ 19)$$

Because the detuning is mainly caused by a change in rotor resistance which occurs at a slow rate, it is a reasonable approximation to assume the value of term $p\lambda_{qr}$ is close to zero. Hence equation (Eq. 19) can be re-written as, $$0 = r_r i_{qr} + \omega_s \lambda_{dr} \qquad (Eq.\ 20)$$

The q-axis rotor flux is given by, $$\lambda_{qr} = L_m i_{qs} + L_r i_{qr} \qquad (Eq.\ 21)$$

and solving for the slip frequency $\omega_s$ from equation (Eq. 20) after substituting $i_{qr}$ from equation (Eq. 21), yields, $$\omega_s = (L_m i_{qs} - \lambda_{qr})/(\lambda_{dr}\tau_r) = (m i_{qs} - n\lambda_{qr})/\lambda_{dr} \qquad (Eq.\ 22)$$

where $$\tau = L_r/r_r, m = L_m/\tau_r,\ \text{and}\ \lambda_{dr} = i_{ds}L_m$$

With the motor operating under field orientation ($\lambda_{qr}=0$) the command slip frequency $\omega_s^* = \omega_s$, and the estimates $\hat{m}$ and $\hat{n}$ coincide with the actual value for m and n in the equation above, as shown by $$\omega_s = \hat{m} i_{qs}^*/\lambda_{dr} \qquad (Eq.\ 23)$$

When a detuning condition occurs, an error appears in the parameter estimates as well as in the rotor flux components, such that frequency given by equation (Eq. 22) becomes, $$\omega_s = ((\hat{m}+\Delta m)i_{qs} - (\hat{n}+\Delta n)(\lambda_{qr}^* + \Delta_{qr}))(1/\lambda_{dr}^* - 1/\Delta\lambda_{dr}) =$$

$$((\hat{m}+\Delta m)i_{qs} - (\hat{n}+\Delta n)\lambda_{qr}^* - (\hat{n}+\Delta n)\Delta\lambda_{qr}))(1/\lambda_{dr}^* - 1/\Delta\lambda'_{dr}) =$$

$$((\hat{m}+\Delta m)i_{qs} - (\hat{n}+\Delta n)\lambda_{qr}^* - (\hat{n}+\Delta n)\lambda_{qr}^* - (\hat{n}+\Delta n)\Delta\lambda_{qr}))/\lambda_{dr}^* -$$

$$((m+\Delta m)i_{qs} - (\hat{n}+\Delta n)\lambda_{qr}^* - (\hat{n}+\Delta n)\Delta\lambda_{qr}))/\Delta\lambda'_{dr} =$$

$$((\hat{m}+\Delta m)i_{qs} - (\hat{n}+\Delta n)\lambda_{qr}^*)/\lambda_{dr}^* - (\hat{n}+\Delta n)\Delta_{qr})/\lambda_{dr}^* -$$

$$((\hat{m}+\Delta m)i_{qs} - (\hat{n}+\Delta n)\lambda_{qr}^* - (\hat{n}+\Delta n)\Delta\lambda_{qr}))/\Delta\lambda'_{dr} \qquad (Eq.\ 24)$$

Since $\lambda_{qr}^* = 0$ $$\omega_s = ((\hat{m}+\Delta m)i_{qs} - (\hat{n}+\Delta n)\Delta\lambda_{qr}^*)\lambda_{dr}^* - ((\hat{m}+\Delta m)i_{qs} - (\hat{n}+\Delta n)\Delta_{qr}))/\Delta)/\lambda'_{dr} \approx$$

$$(\hat{m} i_{qs} + \Delta m i_{qs} - \hat{n}\Delta\lambda_{qr})/\lambda_{dr}^* - \hat{m} i_{qs}/\Delta\lambda'_{dr} \approx$$

$$\hat{m} i_{qs}/\lambda_{dr}^* + \Delta m i_{qs}/\lambda_{dr}^* - \hat{n}\Delta\lambda_{qr}/\lambda_{dr}^* - \hat{m} i_{qs}/\Delta\lambda'_{dr} \qquad (Eq.\ 25)$$

After identifying the terms that correspond to the definition for $\omega_s$, the equation (Eq. 25) reduces to $$0 = \Delta m i_{qs}/\lambda_{dr}^* - \hat{n}\Delta\lambda_{qr}/\lambda_{dr}^* - \hat{m} i_{qs}/\Delta\lambda'_{dr} \qquad (Eq.\ 26)$$

Alternatively, the expression for $\Delta m$ above can be expressed in terms of the actual d-axis rotor flux, instead of the reference values, as $$\Delta m/\hat{m} = \Delta\lambda_{qr}/(\hat{L}_m i_{qs}) + \Delta\lambda'_{dr}{}^{-1}/\lambda_{dr}{}^{-1} \qquad (Eq.\ 27)$$

Redefining $\Delta\lambda'_{dr}{}^{-1}$, $$1/(\lambda_{dr}+\Delta\lambda_{dr}) = \lambda_{dr}{}^{-1} - \Delta\lambda'_{dr}{}^{-1} \qquad (Eq.\ 28)$$

$$\Delta\lambda'_{dr}{}^{-1} = \lambda_{dr}{}^{-1} - 1(\lambda_{dr}+\Delta\lambda_{dr} \qquad (Eq.\ 29)$$

Substituting $\Delta\lambda'_{dr}{}^{-1}$ of equation (Eq. 27), $$\Delta m/\hat{m} = \Delta\lambda_{qr}/(\hat{L}_m i_{qs}) + \Delta\lambda_{dr}/\lambda_{dr} \qquad (Eq.\ 30)$$

As a result, the deviation in the parameter estimation represented by $\Delta m$ is readily computed as a function of the error in the d and q components of the rotor flux. This error is used by the controller algorithm to compute the necessary change in the slip gain command to the slip frequency calculator. When $\Delta m$ is added to the estimate $\hat{m}$, the equation (Eq. 23) yields, $$\omega_s^* = (\hat{m}+\Delta m)i_{qs}^*/\lambda_{dr}^* = (K_s^* + \Delta K_s)i_{qs}^* \qquad (Eq.\ 31)$$

Where the symbol $K_s^*$ is the rated slip gain computed from the next equation, and $\Delta K_s$ is its variation obtained from equation (Eq. 33), $$K_s^* = \hat{m}/\lambda_{dr}^* = \hat{L}_m/(\tau_r^*\lambda_{dr}^*) \qquad (Eq.\ 32)$$

$$\Delta K_s = \Delta m/\lambda_{dr}^* = (\Delta\lambda_{qr}/i_{qs}^* + \hat{L}_m\Delta\lambda_{dr}/\lambda_{dr}^*)/(\tau_r^*\lambda_{dr}^*) \qquad (Eq.\ 33)$$

For function implementation, in block 44, the slip frequency is calculated by $$\omega_s = \omega_{s,ref} + \Delta\omega_s \qquad (Eq.\ 34)$$

here $$\omega_{s,ref} = i_{qs}^*\hat{L}_m/(\tau_r^*\lambda_{dr}^*) = i_{qs}^*r_r/(L_r i_{ds}^*) \qquad (Eq.\ 35)$$

$$\Delta\omega_s = \Delta\omega_{sd} + \Delta\omega_{sq} =$$

$$i_{qs}^*\hat{L}_m\Delta\lambda_{dr}/(\tau_r^*\lambda_{dr}^{*2}) + \Delta\lambda_{qr}/(\tau_r^*\lambda_{dr}^*) =$$

$$\omega_{s,ref}\Delta\lambda_{dr}/\lambda_{dr}^* + \Delta\lambda_{qr}/(\tau_r^*\lambda_{dr}^*) \qquad (Eq.\ 36)$$

Figure 7:
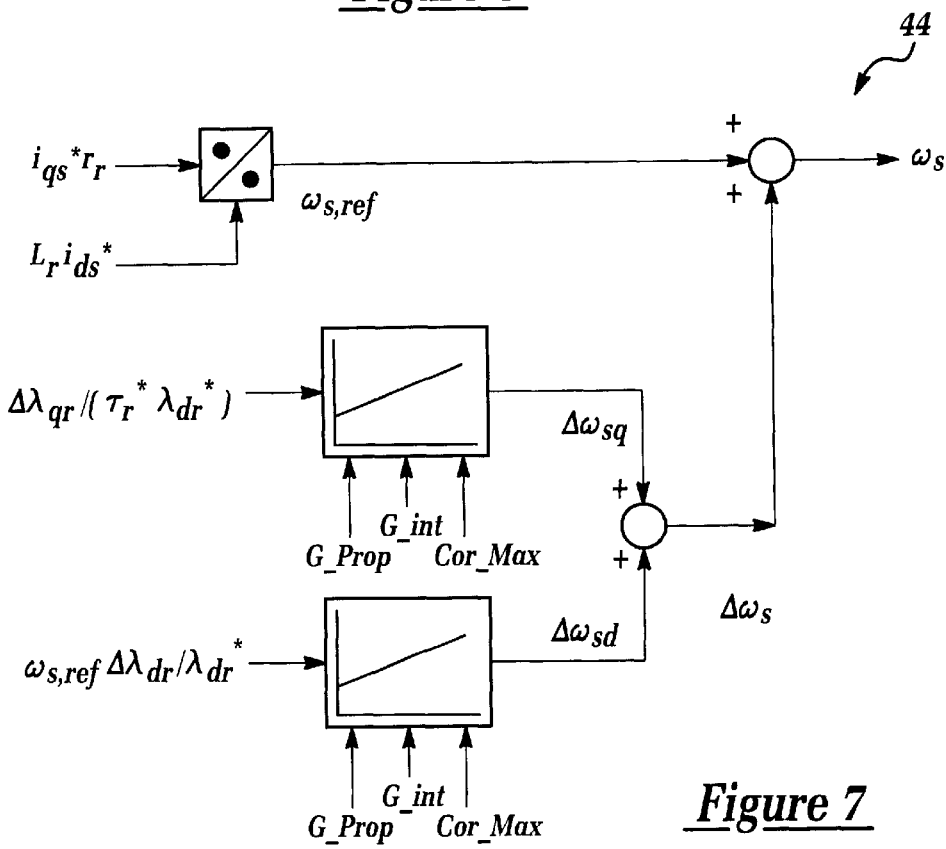
FIG. 7 is a block diagram illustrating the functionality of the slip frequency control module shown in FIG. 5.

One non-limiting embodiment of the foregoing slip frequency calculation module 44 is illustrated in FIG. 7, where the terms G_Prop, G_Int and Cor_Max are calibratable parameters.

Figure 8:
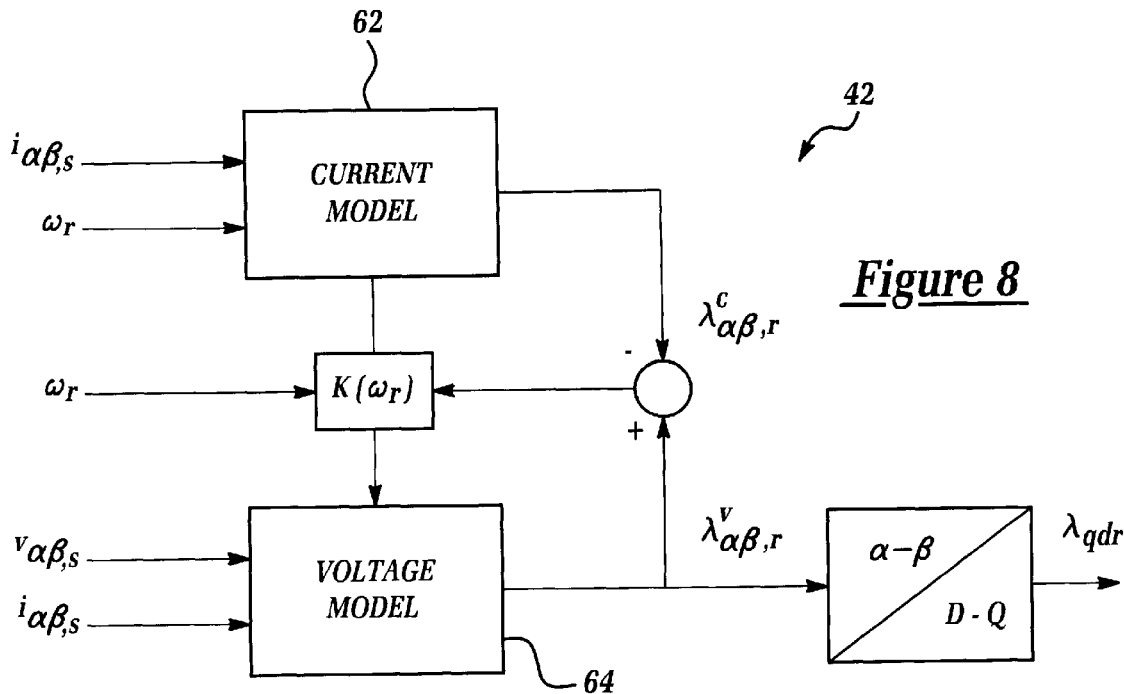
FIG. 8 is a block diagram illustrating the functionality of the flux observer module shown in FIG. 5.

Referring now to FIG. 8, there is shown one non-limiting embodiment of the flux observer module 42. The accuracy of rotor flux is very important for vector control. In order to provide high accuracy, module 42 implements a closed-loop flux observer. Particularly, the closed-loop observer combines a current model, which is represented by block 62, and a voltage model, which is represented by block 64, by use of a speed-dependent gain. The current model 62 serves as an implicit flux reference in which the model attributes are dominant at low speed. The current model has better performance at low speed and even at zero speed. At high speed, the observer follows the voltage model rotor flux estimation attributes since it is less parameter sensitive. The rotor flux is estimated in the stationary frame since the observer is stable in that frame.

Figure 9:
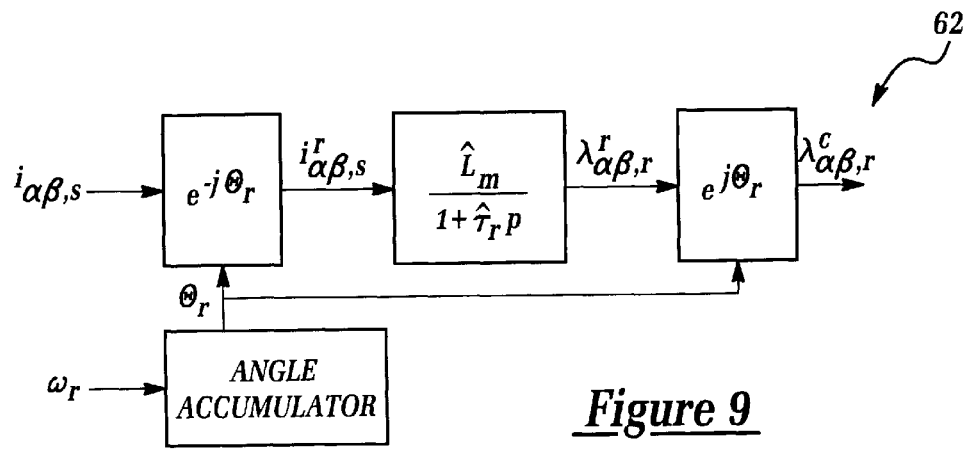
FIG. 9 is a block diagram illustrating the functionality of a current model portion of the flux observer module shown in FIG. 8.

One non-limiting embodiment of the current model 62 is illustrated in FIG. 9. The current model is derived from the induction motor α-β model dynamic equation referred to in the stationary reference frame. As known, $$p\lambda_{\alpha r} = -r_r i_{\alpha r} - \lambda_{\beta r} \omega_r \qquad \text{(Eq. 37)}$$

$$p\lambda_{\beta r} = -r_r i_{\beta r} + \lambda_{\alpha r} \omega_r \qquad \text{(Eq. 38)}$$

and $$\lambda_{\alpha r} = L_r i_{\alpha r} + L_m i_{\alpha s} \qquad \text{(Eq. 39)}$$

$$\lambda_{\beta r} = L_r i_{\beta r} + L_m i_{\beta s} \qquad \text{(Eq. 40)}$$

From the above two equations, $$i_{\alpha r} = \lambda_{\alpha r}/L_r - L_m i_{\alpha s}/L_r \qquad \text{(Eq. 41)}$$

$$i_{\beta r} = \lambda_{\beta r}/L_r - L_m i_{\beta s}/L_r \qquad \text{(Eq. 42)}$$

Substituting equations (Eq. 41) and (Eq. 42) into (Eq. 37) and (Eq. 38), the current model for rotor flux is given as:

$$p\lambda_{\alpha r} = r_r(L_m i_{\alpha s} - \lambda_{\alpha r})/L_r - \lambda_{\beta r} \omega_r \qquad \text{(Eq. 43)}$$

$$p\lambda_{\beta r} = r_r(L_m i_{\beta s} - \lambda_{\beta r})/L_r - \lambda_{\alpha r} \omega_r \qquad \text{(Eq. 44)}$$

For better performance, the rotor speed frame is used and the above two equations become, $$p\lambda_{\alpha r}{}' = r_r(L_m i_{\alpha s}{}' - \lambda_{\alpha r}{}')/L_r \qquad \text{(Eq. 45)}$$

$$p\lambda_{\beta r}{}' = r_r(L_m i_{\beta s}{}' - \lambda_{\beta r}{}')/L_r \qquad \text{(Eq. 46)}$$

By another form, the above two equations may be shown as, $$\lambda_{\alpha r}{}' = i_{\alpha s}{}' L_m/(1+\tau p) \qquad \text{(Eq. 47)}$$

$$\lambda_{\beta r}{}' = i_{\beta s}{}' L_m/(1+\tau p) \qquad \text{(Eq. 48)}$$

where $\tau = L_r/r_r$

The current model 62 is best implemented in the rotor frame (i.e., the physical rotor frame, not the rotor flux frame) and thus requires transformation (e.g., see Eqs. 70 and 71) between the stationary and rotor frame using the measured rotor position. The transformation to the rotor frame completely eliminates some undesirable cross coupling, which is speed-dependent, and makes the model independent of the rotor speed. Using the first-order discrete approximation commonly referred to as the "Euler" method, and estimate parameters, the approximate sample-data model for rotor flux in the rotor frame is $$\lambda_{\alpha\beta r}{}'[k] = T^* L_m{}^* i_{\alpha\beta s}{}'[k-1]/\tau + (\tau-T)^* \lambda_{\alpha\beta r}{}'[k-1]/\tau \qquad \text{(Eq. 49)}$$

where T is the sampling period.

The equation (Eq. 49) is used to calculate the speed-invariant rotor flux. Finally the current model rotor flux is rotated back into the stationary reference (e.g., see Eqs. 72 and 73). For the vector rotation, all that is needed is the rotor angle ($\theta_r$), which is accumulated from rotor speed. Rotor speed is measured by the vehicle at all times.

$$\theta_r = \Sigma \omega_r T \qquad \text{(Eq. 50)}$$

where T is the sampling period and $\omega_r$ is the rotor speed. Therefore, the flux for the current model is give as, $$\lambda_{\alpha\beta r}{}^c[k] = \lambda_{\alpha\beta r}{}'[k] * e^{j\theta} \qquad \text{(Eq. 51)}$$

Figure 10:
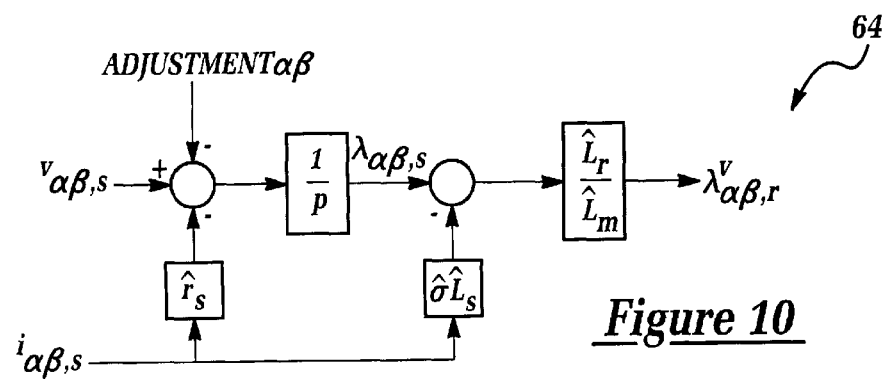
FIG. 10 is a block diagram illustrating the functionality of a voltage model portion of the flux observer module shown in FIG. 8.

One non-limiting embodiment of the voltage model 64 for the flux observer is illustrated in FIG. 10. The voltage model is best described through the following equations. As known, $$v_{\alpha\beta s} = r_s{}^* i_{\alpha\beta s} + p\lambda_{\alpha\beta s} \qquad \text{(Eq. 52)}$$

so, $$\lambda_{\alpha\beta s} = \int (v_{\alpha\beta s} - r_s i_{\alpha\beta s}) \qquad \text{(Eq. 53)}$$

and as known, $$E_s = \omega_e \lambda_h \qquad \text{(Eq. 54)}$$

$$E_r = \omega_e \lambda_r \qquad \text{(Eq. 55)}$$

and $$E_r = E_s * L_r/L_m \qquad \text{(Eq. 56)}$$

From equations (Eq. 54), (Eq. 55) and (Eq. 56), $$\lambda_r = \lambda_h * L_r/L_m = (\lambda_s 31 \, \sigma L_s i_s) L_r/L_m \qquad \text{(Eq. 57)}$$

where $$\sigma L_s = L_\sigma = L_s\left(1 - \frac{L_m^2}{L_s L_r}\right)$$

and $\lambda_h$ is the flux from $L_h$ and the rotor flux for voltage model is given by $$\lambda_{\alpha\beta r}{}^v = (\lambda_{\alpha\beta s} - \sigma L_s i_{\alpha\beta s}) L_r/L_m \qquad \text{(Eq. 58)}$$

Therefore, we have $$\lambda_{\alpha\beta s}{}'[k] = (\lambda_{\alpha\beta r}{}'[k-1] - \sigma L_s * i_{\alpha\beta s}[k-1]) * L_r/L_m \qquad \text{(Eq. 59)}$$

where $$\lambda_{\alpha\beta s}[k] = \lambda_{\alpha\beta s}[k-1] + (v_{\alpha\beta s}[k] - v_{\alpha\beta s}[k-1]) - r_s(i_{\alpha\beta s}[k-1] - i_{\alpha\beta s}[k-1]) - (\text{Adjustment}_{\alpha\beta}[k] - \text{Adjustment}_{\alpha\beta}[k-1]) \qquad \text{(Eq. 60)}$$

and $\text{Adjustment}_{\alpha\beta} = \text{gainFluxOb} * (\lambda_{\alpha\beta r}{}^r - \lambda_{\alpha\beta r}{}^c)$ It must be noted that the voltage model of the flux observer is based on the stationary frame. The current $i_{\alpha\beta s}$ is calculated by transforming the D-Q coordinates into α-β coordinates. The rotation angle is given by, $$\theta_e = \Sigma \omega_e T = (\omega_r + \omega_s) T \quad \text{(Eq. 61)}$$

where T is the sampling period and $\omega_e$ is the synchronous speed.

Since the rotor flux is used by the adaptive controller for slip frequency at the D-Q axes, finally the rotor flux for the D-Q axes is given by, $$\lambda_{qdr}[k] = \lambda_{\alpha\beta r}'[k] * e^{j\theta} \quad \text{(Eq. 62)}$$

Figure 11:
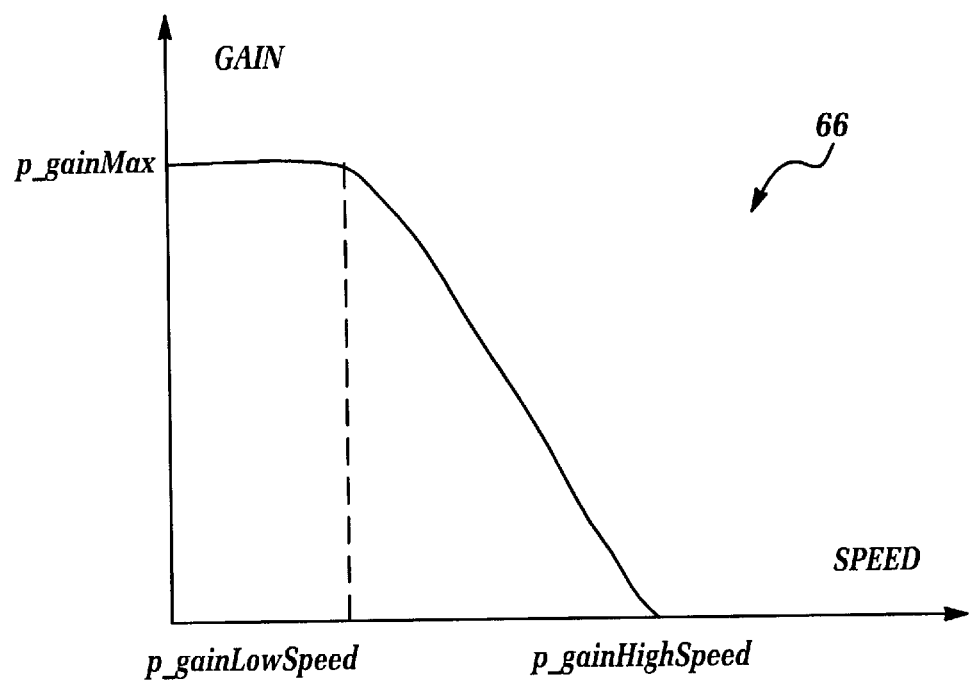
FIG. 11 is a graph illustrating a gain function used by the flux observer module shown in FIG. 8.

The gain function, which precisely controls the closed-loop observer bandwidth, permits a transition from the current to the voltage model flux estimating attributes based on rotor speed. One non-limiting embodiment of the gain function is illustrated by the graph 66 of FIG. 11. The gain function operates as follows:

if speed is less than p_gainLowSpeed
        gainFluxOb=p_gainMax
    else if speed is over p_gainHighspeed
        gainFluxOb=0
    else
        gainFluxOb=p_gainMax*(p_gainHighSpeed-speed)
        /(p_gainHighSpeed-p_gainLowSpeed)
where
    p_gainMax=2π*p_gainLowSpeed*$L_m/L_r$
and p_gainHighSpeed and p_gainLowSpeed are calibratable parameters.

Referring back to FIG. 5, block 46 comprises a rotor resistance adaption block or module which provides a rotor resistance measurement $r_r$ in the following manner. The vector control concepts imply that the rotor flux is entirely in the d-axis, resulting in $$\lambda_{qr} = 0$$

The based on the D-Q model 34 shown in FIG. 4, $$0 = r_r * i_{qr} + S * \omega_e \cdot \lambda_{dr} \quad \text{(Eq. 63)}$$

The following slip relation follows immediately from equation (Eq. 63):

$$r_r = -S\omega_e \lambda_{dr}/i_{qr} \quad \text{(Eq. 64)}$$

And from model 34, $$r_r = L_r * S\omega_e * \lambda_{dr}/(L_m * i_{qs}) \quad \text{(Eq. 65)}$$

or $$\text{res\_rotor} = \text{flux\_}fb * \text{omega\_rot} * L_r/(i\_q\_\text{ref} * L_m) \quad \text{(Eq. 66)}$$

Block 48 of vector control module 20 comprises an angle accumulator function. Block 48 provides an angle theta ($\theta_e$) which is used to perform axis transformation or rotation (e.g., to transform from α-β axes to D-Q axes, voltage and current sector angle). Block 48 includes the following equation:

$$\text{theta} = \Sigma(f\_\text{stat} * \text{Tpwm}) \quad \text{(Eq. 67)}$$

where Tpwm is a predetermined constant and f_stat is the stator frequency. Functional block or module 52 comprises a conventional encoder which is coupled to the motor 12 and which provides a signal to functional block or module 50. Block 50 utilizes the signal from block 52 to perform a conventional speed measurement, thereby providing rotor speed $\omega_r$.

Functional block or module 54 takes a conventional current measurement from the motor and provides motor phase currents iA and iB to functional block or module 56. Block 56 converts the measured motor phase currents iA, iB into the two axis phase currents $i_\alpha$ and $i_\beta$. Particularly, the transformation is performed by use of the following equations.

$$i_\alpha = i_A \quad \text{(Eq. 68)}$$

$$i_\beta = \frac{-2}{\sqrt{3}}\left(i_B + \frac{1}{2}i_A\right) \quad \text{(Eq. 69)}$$

Figure 12:
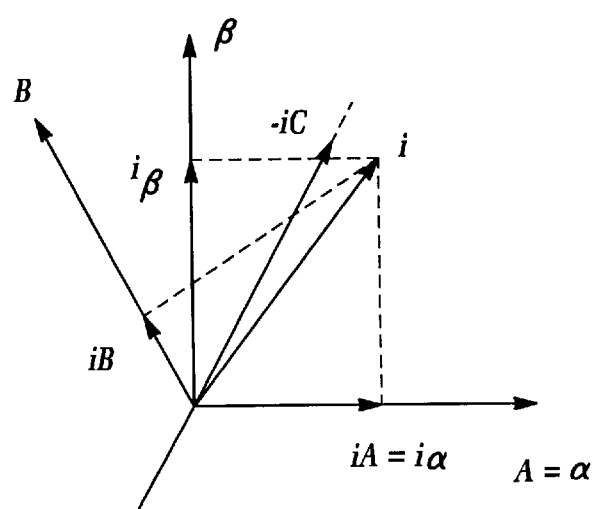
FIG. 12 is a graphical representation illustrating the relationship between the motor phase currents iA, iB the two axis phase currents $i_\alpha$ and $i_\beta$.

As evident from the foregoing equations, the amplitude of the resulting space vector will have the peak value of the phase current. A graphical representation of this relationship is shown in FIG. 12.

Block 56 also performs a transformation between the and α-β axis coordinates and the D-Q axis coordinates. Particularly, the following function realizes a transformation from the phase axis α-β coordinates into the D-Q axis coordinates.

$$f_d = f_\alpha \cos(\theta) + f_\beta * \sin(\theta) \quad \text{(Eq. 70)}$$

$$f_q = -f_\alpha \sin(\theta) + f_{62} * \sin(\theta) \quad \text{(Eq. 71)}$$

A transformation from the phase axis D-Q coordinates into the α-β coordinates is performed as follows.

$$f_\alpha = f_d \cos(\theta) + f_q * \sin(\theta) \quad \text{(Eq. 72)}$$

$$f_\beta = f_d \sin(\theta) + f_q * \cos(\theta) \quad \text{(Eq. 73)}$$

Figure 13:
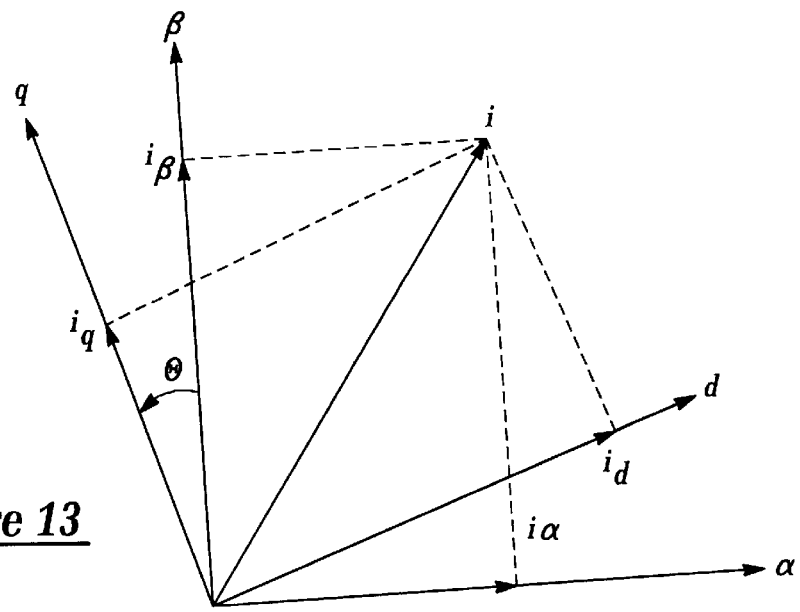
FIG. 13 is a graphical representation illustrating the relationship between the phase axis $\alpha$-$\beta$ coordinates and the D-Q axis coordinates.

A graphical representation of this transformation is shown in FIG. 13.

Figure 14:
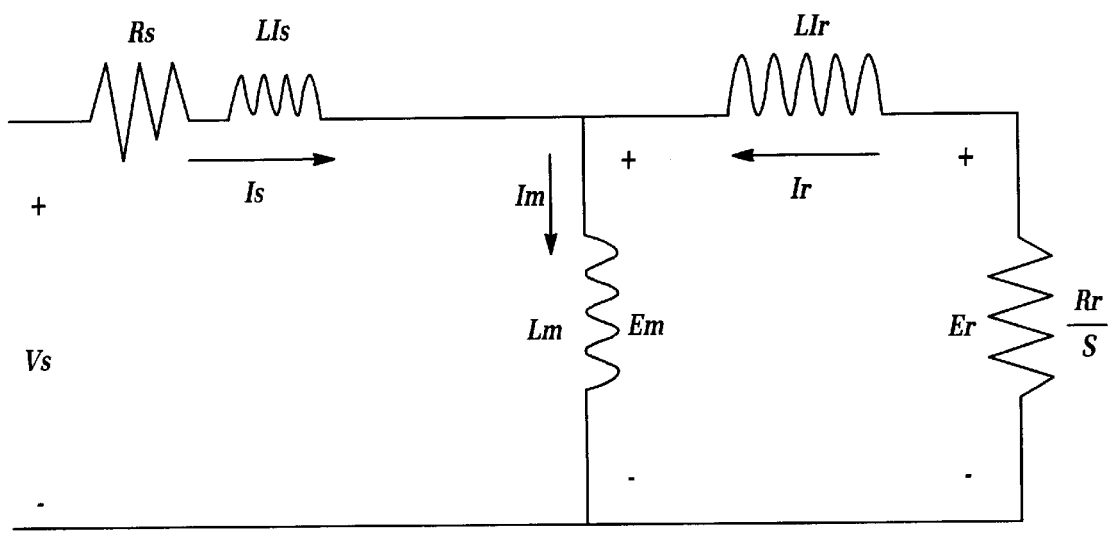
FIG. 14 is a diagram of a conventional circuit used to model an induction motor.

Functional block or module 60 provides the reference voltage with respect to the D-Q axis. The function of module 60 is best described by the following equations. The D-Q axis model of an induction motor with the reference axes rotating at synchronous speed $\omega_s$ is:

$$V_{ds} = r_s i_{ds} + p\lambda_{ds} - \omega_s \lambda_{qs} \quad \text{(Eq. 74)}$$

$$V_{qs} = r_s i_{qs} + p\lambda_{qs} - \omega_s \lambda_{ds} \quad \text{(Eq. 75)}$$

$$0 = r_r i_{dr} + p\lambda_{dr} - S\omega_s \lambda_{qr} \quad \text{(Eq. 76)}$$

$$0 = r_r I_{qr} + p\lambda_{qr} - S\omega_s \lambda_{dr} \quad \text{(Eq. 77)}$$

where $$\lambda_{ds} = L_{1s} i_{ds} + L_m (i_{ds} + i_{dr}) \quad \text{(Eq. 78)}$$

$$\lambda_{qs} = L_{ls} i_{qs} + L_m (i_{qs} + i_{qr}) \quad \text{(Eq. 79)}$$

$$\lambda_{dr} = L_{lr} i_{dr} + L_m (i_{ds} + i_{dr}) \quad \text{(Eq. 80)}$$

$$\lambda_{qr} = L_{lr} i_{qr} + L_m (i_{qs} + i_{qr}) \quad \text{(Eq. 81)}$$

and $L_{ls}$ and $L_{lr}$ are the stator and rotor leakage inductance, respectively, and $L_m$ is the magnetizing inductance. FIG. 14 is a conventional induction motor equivalent circuit containing two series reactance normally referred to as the stator and rotor leakage reactance. Because this conventional circuit is not well-suited for vector control analysis, the modified equivalent circuit model 34 of FIG. 4, in which the series reactance in the rotor branch is zero, is used to analyze the motor control algorithm. It is important to note that the stator current is shown divided into two components; one through the new magnetizing branch called Id and one through the new rotor resistance called Iq. These are the two components of stator current which respectively control the rotor flux and torque.

The vector control concepts imply that the rotor flux is entirely in the d-axis, resulting in $$\lambda_{qr}=0 \tag{Eq. 82}$$

Then from equation (Eq. 81)

$$i_{qr} = -\frac{L_m}{L_r} i_{qs} \tag{Eq. 83}$$

where $$L_r = L_m + L_{lr} \tag{Eq. 84}$$

Combining Equations (Eq. 74), (Eq. 78) and (Eq. 79), $$v_{ds}=r_s i_{ds}+L_{ls} p i_{ds}+L_m p(i_{ds}+i_{dr})-\omega(L_{ls} i_{qs}+L_m(i_{qs}+i_{qr})) \tag{Eq. 85}$$

During a steady state, $i_{dr}=0$ and $i_{ds}$ does not change. Therefore, the above equation (eq. 85) can be expresses as:

$$v_{ds}=r_s i_{ds}-\omega(L_{ls} i_{qs}+L_m(i_{qs}+i_{qr})) \tag{Eq. 86}$$

Using equation (Eq. 83):

$$v_{ds} = r_s i_{ds} - \omega\left(L_{ls} i_{qs} + L_m\left(i_{qs} - \frac{L_m}{L_r} i_{qs}\right)\right) \tag{Eq. 87}$$

$$= r_s i_{ds} - \omega L_{ls} i_{qs}\left(1 + \frac{L_m L_{lr}}{L_r L_{ls}}\right)$$

It can also be expressed as:

$$v_{ds}=r_s i_{ds}=\omega L_{94} i_{qs} \tag{Eq. 88}$$

where $$L_\sigma = L_s\left(1 - \frac{L_m^2}{L_s L_r}\right) \tag{Eq. 89}$$

$$L_s = L_m + L_{ls} \tag{Eq. 90}$$

For q-axis reference voltage, combining equations (Eq. 75), (Eq. 78) and (Eq. 79), $$v_{qs}=r_s i_{qs}+L_{ls} p i_{qs}+L_m p(i_{qs}+i_{qr})+\omega(L_{ls} i_{ds}+L_m(i_{ds}+i_{dr})) \tag{Eq. 91}$$

During the steady state, $i_{qr}$ and $i_{qs}$ do not change. Therefore, the above equation can be expressed as:

$$v_{qs}=r_s i_{qs}+\omega L_{ls} i_{ds}+\omega L_m i_{ds}=r_s i_{qs}+\omega L_s i_{ds} \tag{Eq. 92}$$

$$v_{qs} = r_s i_{qs} + \omega L_{ls} i_{ds} + \omega L_m i_{ds} \tag{Eq. 92}$$

$$= r_s i_{qs} + \omega L_s i_{ds}$$

$$= r_s i_{qs} + \omega L_\sigma i_{ds} + \omega \frac{L_m^2}{L_r} i_{ds}$$

As known the rotor flux is given by:

$$\lambda_s = \frac{L_m^2}{L_r} i_{ds} = L_h i_{ds} \tag{Eq. 93}$$

where $L_h = \frac{L_m^2}{L_r}$

So the q-axis voltage can be calculated from:

$$v_{qs}=r_s i_{qs}+\omega L_{94} i_{ds}+\omega\lambda_s=r_s i_{qs}+\omega L_\sigma i_{ds}+\omega L_h i_{ds} \tag{Eq. 94}$$

Equations (Eq. 88) and (Eq. 94) may also be written as:

$$u\_d\_ref=Rs*i\_d\_ref-f\_stat*l\_sig*i\_q\_ref \tag{Eq. 95}$$

$$u\_d\_ref=Rs*i\_q\_ref+f\_stat*l\_sig*i\_d\_ref+f\_stat*lh*i\tag{Eq. 96}$$

Figure 15:
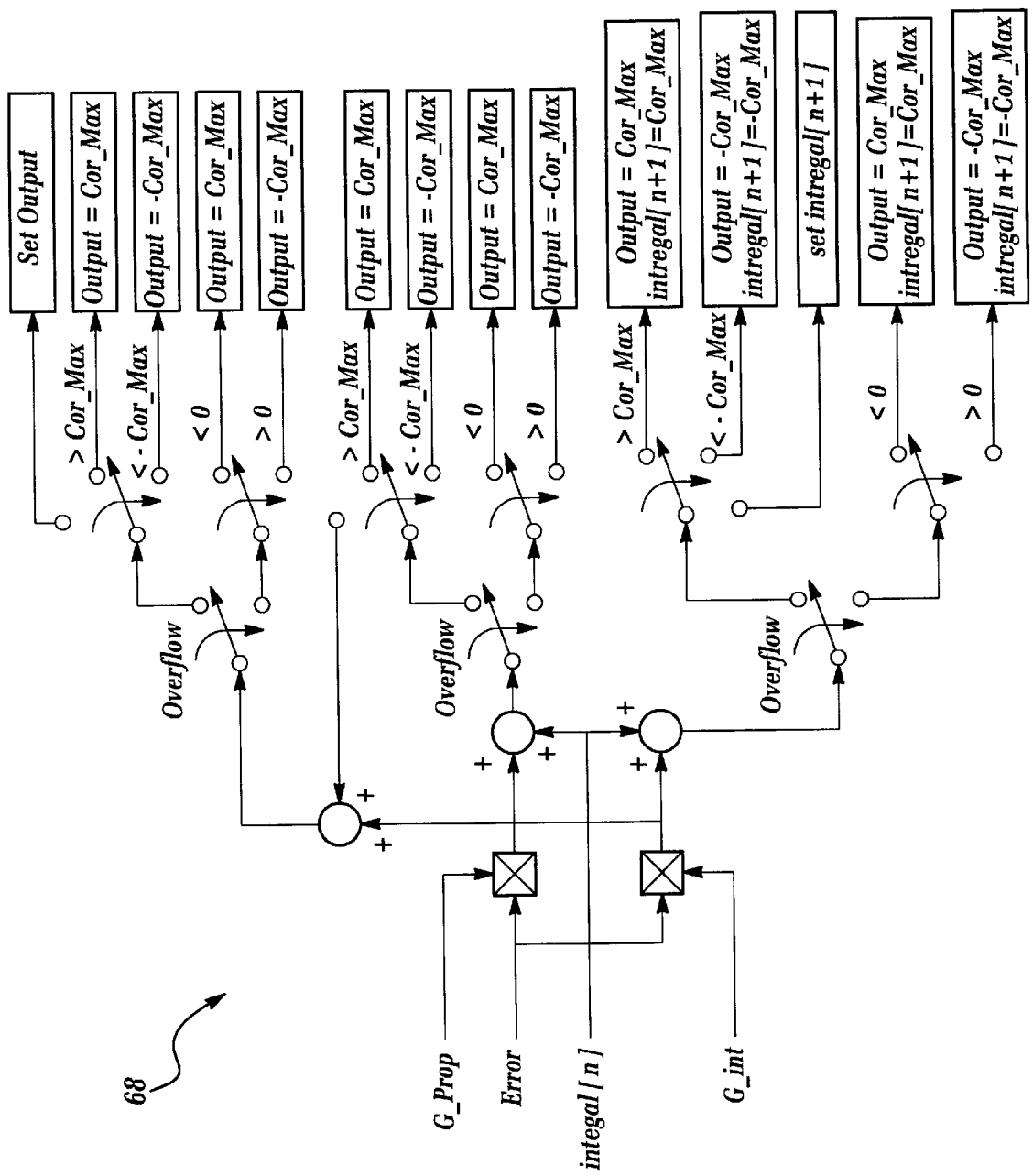
FIG. 15 is a flow diagram illustrating one non-limiting embodiment of the functionality of a proportional and integral control algorithm used within the vector control module shown in FIG. 5.

Finally, blocks 58 of FIG. 5 represent conventional proportional and integral ("PI") controller or control modules. In one non-limiting embodiment, the PI control function provided by blocks 58 is illustrated in functional flow diagram 68 of FIG. 15.

Space Vector PWM

Figure 16:
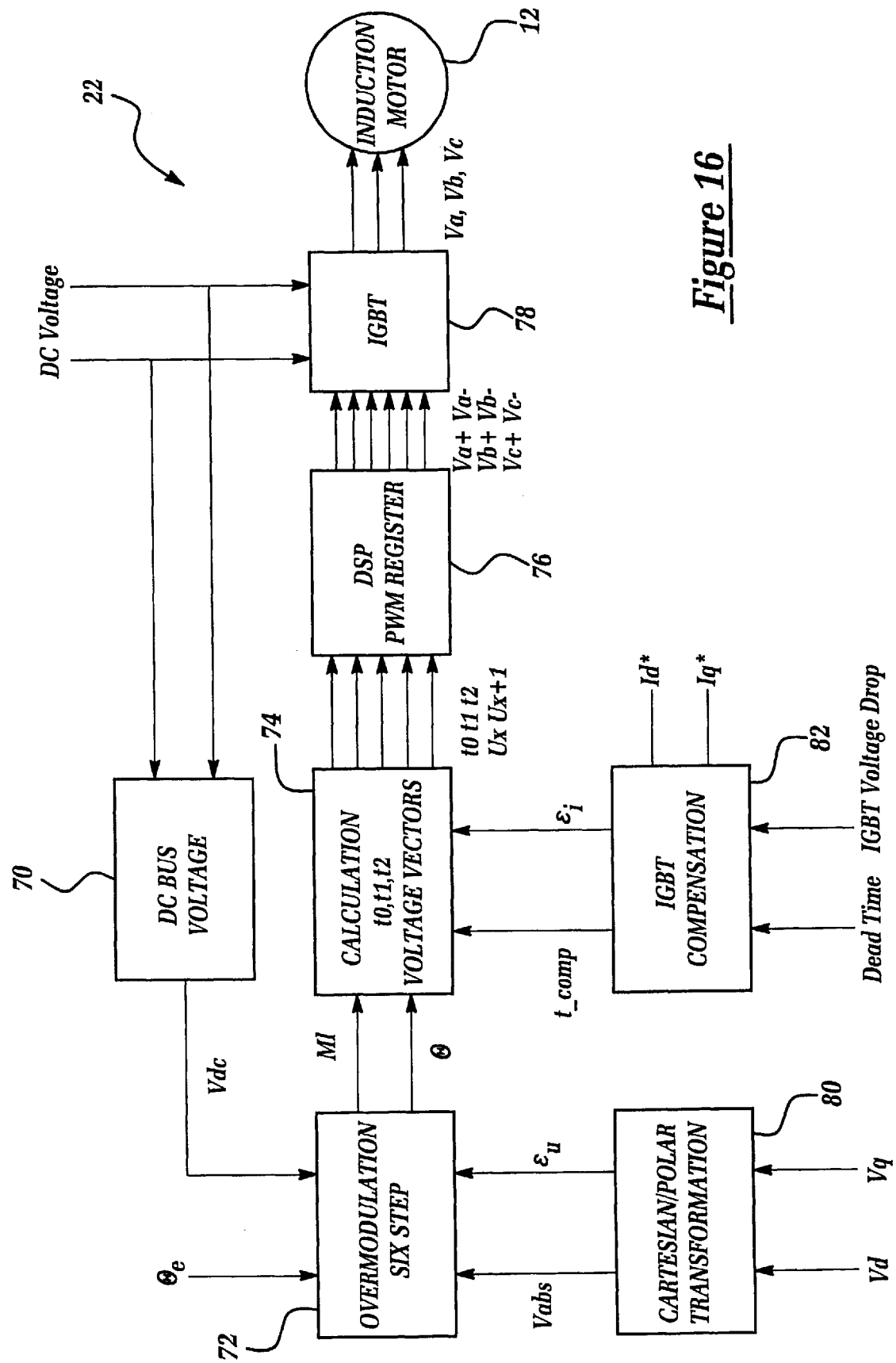
FIG. 16 is a block diagram illustrating the functionality of the space vector PWM module used within the control system shown in FIG. 1.

After determining the desired voltages in the direct or "d" axis ($V_d^*$ or $V_{ds}$) and quadrature or "q" axis ($V_q^*$ or $V_{qs}$), the space vector pulse width modulating "PWM" module 22 activates the two closest voltage vectors and controls the active time for the motor control signal. The preferred embodiment of this space vector PWM module 22 is shown in FIG. 16. Each of the active or inactive times (t0, t1 and t2) are calculated by module 22 from the demanded voltage and frequency. Additionally, the "dead time" of the IGBT device is compensated in this module.

Since torque becomes critical during high speed, the below-described over-modulation and six step functions shown in block 72 are especially important in the present system. Particularly, the smooth transition between normal operation, over modulation and six step provided by the present system is important for vehicle applications.

Functional block or module 70 represents a conventional DC bus, which is coupled to the source of DC electrical power and which provides DC bus voltage Vdc. Block 72 represents the over modulation and six step functions of module 22.

In block 72, the modulation amplitude is determined as:

$$mi=1.732*Vabs/voltDC \tag{Eq. 97}$$

where Vabs is the absolute value of voltage vector and voltDC is the DC bus voltage, Vdc.

When mi is less then 1.0, the AC voltage is in sinusoidal waveform. If mi is over 1.0, the space vector reaches over-modulation mode.

Figure 17:
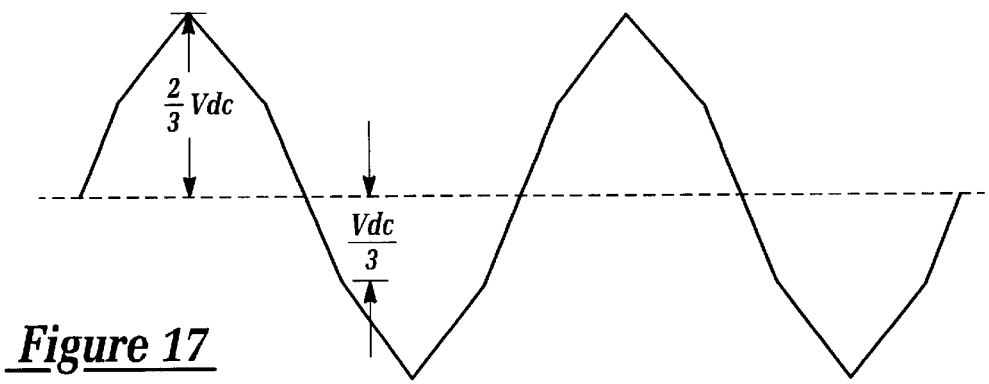
FIG. 17 is a graph of the phase voltage when the modulation amplitude (mi) equals 1.05.

When mi equals 1.05, t0 is always equal to zero and t1 and t2 share TPWM. The output voltage is along six sides of a hexagon. A graphical representation of the phase voltage when mi=1.05 is illustrated in FIG. 17.

Figure 18:
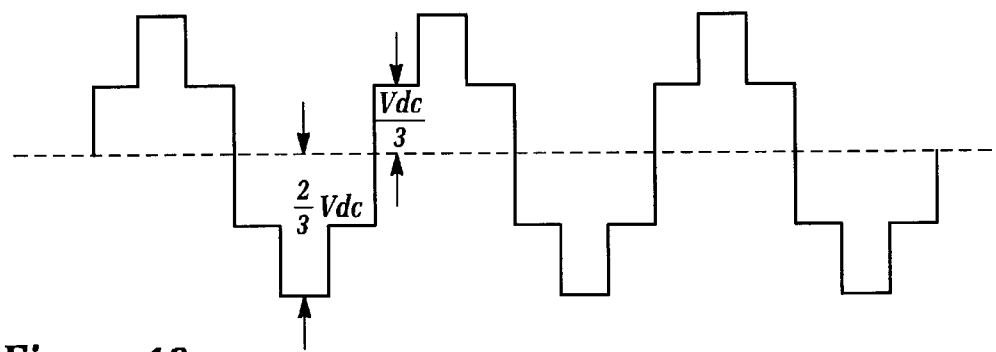
FIG. 18 is a graph of the phase voltage when the modulation amplitude (mi) is greater than or equal to 1.10.

When mi is greater than or equal to 1.10, t1 or t2 is equal to the predetermined constant TPWM for a period of time corresponding to 60 degrees and the six step function is active. A graphical representation of the phase voltage when mi>=1.10 is illustrated in FIG. 18.

Figure 19:
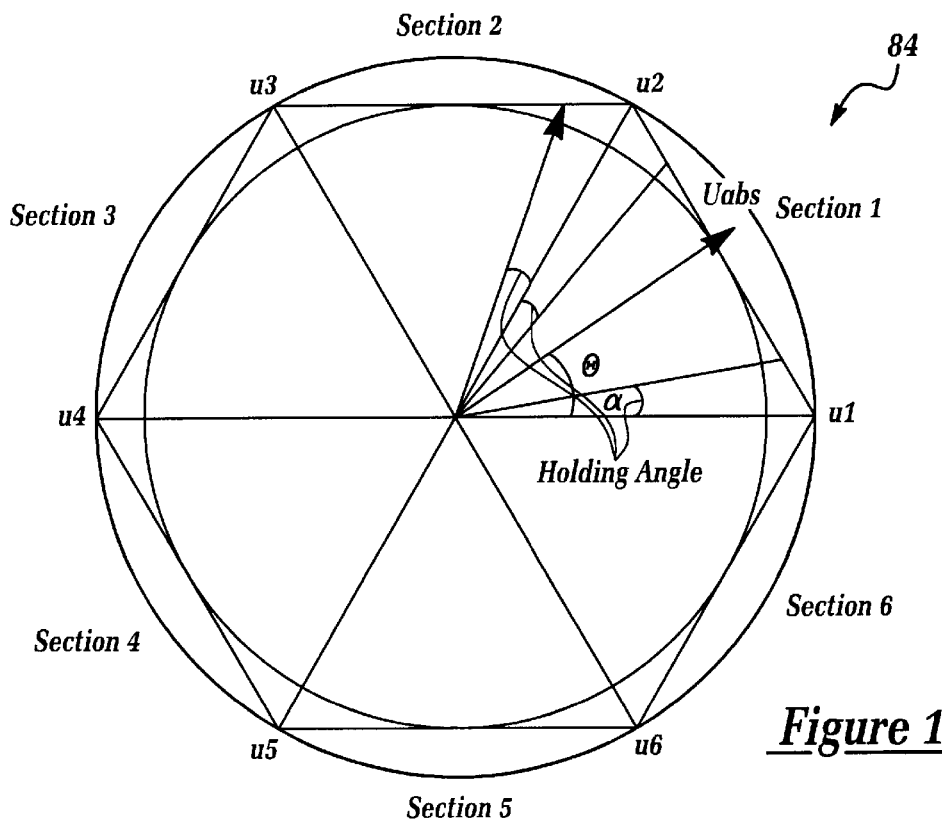
FIG. 19 is a graphical representation of the voltage vector with holding angle.

To better understand the various over-modulation modes, reference is now made to the hexagon diagram 84, shown in FIG. 19. When mi is equal to 1.0, the AC voltage has a maximum value in the sinusoidal waveform. The voltage vector gradually uses voltage along side of the hexagon when mi continues to increase. Finally, the voltage vector is the same as the hexagon when mi reaches 1.05.

During the period of the holding angle, the voltage is a sinusoidal waveform. In the preferred embodiment, the equations for the holding angle are as follows:

holdingAngle=−27.48*mi+27.94 (1.0<mi<=1.0045);

holdingAngle=−7.8*mi+8.23 (1.0045<mi<=1.04335);

holdingAngle=−24.027*mi+25.15 (1.04335<mi<=1.05); and

0<=holdingAngle<=PI/6.0

When the sector angle ($\alpha$) is in the range of the holdingAngle, t1=TPWM*mi* sin($\pi$/3−$\alpha$)

t2=TPWM*mi* sin($\alpha$)

t0=TPWM−t1−t2

For the voltage along side of the hexagon, while the sector angle ($\alpha$) is out of the range of the holdingAngle, t1=TPWM*mi* sin($\pi$/3−$\alpha$)

t2=TPWM*mi* sin($\alpha$)

And the total time of t1 & t2 should not be more than TPWM, t1'=t1*TPWM/(t1+t2);

t2'=t2*TPWM/(t2+t2); and t0'=0.0.

During this over-modulation stage, the output voltage is in the transition from voltage along the side of the hexagon (mi=1.05) to six step (mi=1.10).

The voltage vector is held at a vertex for particular time and then moves along the side of the hexagon for the rest of the switching period. The holding angle, which depends on mi, controls the time interval the active switching state remains at the vertex.

The equations for holding angle:

holdingAngle=5.82*mi−6.09 (1.05<mi<1.078);

holdingAngle=10.68*mi−11.34 (1.078<=mi<1.097);

holdingAngle=44.51*mi−48.43 (1.097<=mi<1.10); and

0<=holdingAngle<=PI/6.0

When the sector angle ($\alpha$) is less then the holdingAngle, the voltage remains at the vertex and t1 is equal to TPWM and t2 and t0 are zero.

When the sector angle($\alpha$) is greater than ($\pi$/3−holdingAngle), voltage remains at the vertex and t2 is equal to TPWM and t1 and t0 are zero.

For the voltage along the side of the hexagon, while the sector angle ($\alpha$) is out of the range of the holdingAngle, t1=TPWM*mi* sin($\pi$/3−$\alpha$)

t2=TPWM*mi* sin($\alpha$)

The total time of t1 & t2 should not be more than TPWM, t1'=t1*TPWM/(t1+t2)

t2'=t2*TPWM/(t1+t2)

t0'=0.0;

As previously explained, the sector angle value $\alpha$ is between 0 and $\pi$/3. The following sector angle values provide the following values for t1, t2, and t0.

the sector angle: $\alpha$<$\pi$/6 t1=TPWM t2=0 t0=0

The sector angle: $\pi$/6<=$\alpha$<$\pi$/3 t1=0 t2=TPWM t0=0

The phase voltage is shown in FIG. 18.

A modulation ratio is calculated within block 72 when the motor operates at over modulation mode and mi is higher than the set point (MI_LINEAR+p_delta_mi) of over modulation. Otherwise the ratio is equal to 100%. The purpose of the ratio is to give the best estimation of the D-Q axes voltage. The ratio is calculated by use of the following equation.

$$\text{ratio\_mi} = (MI\_LINEAR + p\_delta\_mi)/mi \qquad \text{(Eq. 98)}$$

Block 74 represents the calculation of t0, t1 and t2 and the voltage vectors. Blocks 76 is a conventional digital signal processing ("DSP") register which receives the t2, t1, t0 and voltage vector values from block 74 and which converts the values into three phase voltage values. Block 78 represents a conventional IGBT device ("IGBT") which uses the received three phase values in a conventional manner to convert the DC voltage into a three phase voltage signal which is provided to induction motor 12.

Block 80 represents a conventional cartesian to polar coordinate transformation function. Finally, block 82 of space vector PWM module 22 provides time compensation for the IGBT device. The time compensation is best represented by the following equation:

$$tComp = p\_t\_delay + p\_uo\_delay * TPWM/voltDC \qquad \text{(Eq. 99)}$$

Calculation of the amplitude of the voltage error (tComp) depends on the time delay (p_t_delay) in the driver circuit and the forward voltage of the IGBT and diodes. The term tComp is the time compensation. The time period is used to compensate the PWM time according to the angle of current vector.

The voltage vector angle $\theta$ is given as:

$$\theta_i = \theta_e + \epsilon_i$$

If voltage vector angle $\theta$ is greater then $2\pi$, $$\theta_i = \theta_i - 2\pi \quad (0 <= \theta_i < 2\pi)$$

The table shown in FIG. 20 illustrates the time in three phases versus the current sector.

It should be appreciated that the foregoing control system 16 provides extremely accurate and efficient control of motor 12 by use of torque control module 18, vector control module 20 and space vector PWM module 22. It is understood that the invention is not limited by the exact construction or method illustrated and described above, but that various changes and/or modifications may be made without departing from the spirit and/or scope of the inventions.

What is claimed is:

1. A motor control system for use within a vehicle including an alternating current type electric motor, a direct current type electrical power supply, and at least one driver-operated control, said control system comprising:
   a first portion which is communicatively coupled to and receives torque commands from said at least one driver-operated control;
   a second portion which receives generated flux current and torque current, and which includes a flux observer having a current model which is applied when said motor is operating at a low speed, and a voltage model which is applied when said motor is operating at a high speed;
   a torque control portion which receives torque commands from said at least one driver-operated control and which is effective to provide said torque current and said flux current based upon said received torque commands;
   a vector control portion which receives said torque current and said flux current and which is effective to provide a first voltage value and a second voltage value based upon said torque current and said flux current; and
   a space vector pulse-width modulating portion, which is coupled to said power supply and to said motor, which receives said first voltage value and said second voltage value and which uses said first and second voltage values to deliver a multi-phase voltage signal to said motor, effective to cause said motor to accurately deliver said torque commands.

2. The motor control system of claim 1 wherein said multi-phase voltage signal comprises a three-phase voltage signal.

3. The motor control system of claim 1 wherein said power supply comprises a fuel cell.

4. The motor control system of claim 1 wherein said power supply comprises a battery.

5. The motor control system of claim 1 wherein said first voltage value is a direct axis voltage value and said second voltage value is a quadrature axis voltage value.

6. The motor control system of claim 1 wherein said space vector pulse-width modulating portion comprises a IGBT device which delivers said multi-phase voltage signal to said motor.

7. The motor control system of claim 1 wherein said vehicle is an electric vehicle.

8. The motor control system of claim 1 wherein said vehicle is a hybrid electric vehicle.

9. A motor control system for use in combination with a vehicle of the type having an alternating current induction motor which selectively delivers torque to said vehicle, a power supply, and at least one driver-operated control, said motor control system comprising:
   a first portion which is communicatively coupled to and receives torque commands from said at least one driver operated control, said first portion being effective to generate a flux current and a torque commands and a synchronous speed value of said motor;
   a second portion which receives said generated flux current, and which includes a flux observer having a current model which is applied when said motor is operating at a low speed, and a voltage model which is applied when said motor is operating at a high speed, said second portion being effective to generate a direct axis voltage and a quadrature axis voltage based upon said generated flux and torque currents and at least one motor specific parameter; and
   a third portion which receives said direct and quadrature axis voltages and which converts said direct and quadrature axis voltages into a three phase voltage signal which is communicated to said induction motor, effective to cause said motor to accurately deliver said torque commands.

10. The motor control system of claim 9 wherein said first portion includes a flux reference map, said first portion being effective to select an optimal rotor flux level by indexing said reference map by use of said torque commands and said synchronous speed value, said first portion being further effective to use said optimal rotor flux level to generate said flux current and said torque current.

11. The motor control system of claim 9 wherein said third portion comprises an IGBT module.

12. The motor control system of claim 11 wherein said third portion is effective to selectively perform overmodulation and six step functions.

13. A method for controlling an alternating current induction motor within a vehicle including direct current power supply; at least one driver-operated control; a first portion which is communicatively coupled to and receives torque commands from said at least one driver operated control; and a second portion which receives said generated flux current and torque current, said method comprising the steps of:
   receiving torque commands from said at least one driver-operated control;
   generating a torque current and a flux current based upon said received torque commands;
   generating a direct axis voltage and a quadrature axis voltage based upon said generated torque current and flux current;
   converting said direct axis voltage and said quadrature axis voltage into a pulse-width modulated signal;
   providing a flux observer having a current model which is applied when said motor is operating at a low speed;
   providing a voltage model which is applied when said motor is operating at a high speed; and
   using said pulse width modulated signal and said direct current power supply to provide a three-phase voltage signal to said induction motor, effective to cause said induction motor to accurately deliver said torque commands.

14. The motor control system of claim 13 wherein said direct current power supply comprises a fuel cell.

15. The motor control system of claim 13 wherein said direct current power supply comprises a battery.

16. The motor control system of claim 13 wherein step of using said pulse width modulated signal and said direct current power supply to provide a three-phase voltage signal to said induction motor is performed using a IGBT device.

17. The motor control system of claim 13 wherein said vehicle is an electric vehicle.

18. The motor control system of claim 13 wherein said vehicle comprises a hybrid electric vehicle.

* * * * *